No. 897,270. PATENTED SEPT. 1, 1908.
W. H. CHAPIN.
RUNNING GEAR FOR VEHICLES.
APPLICATION FILED DEC. 11, 1905.
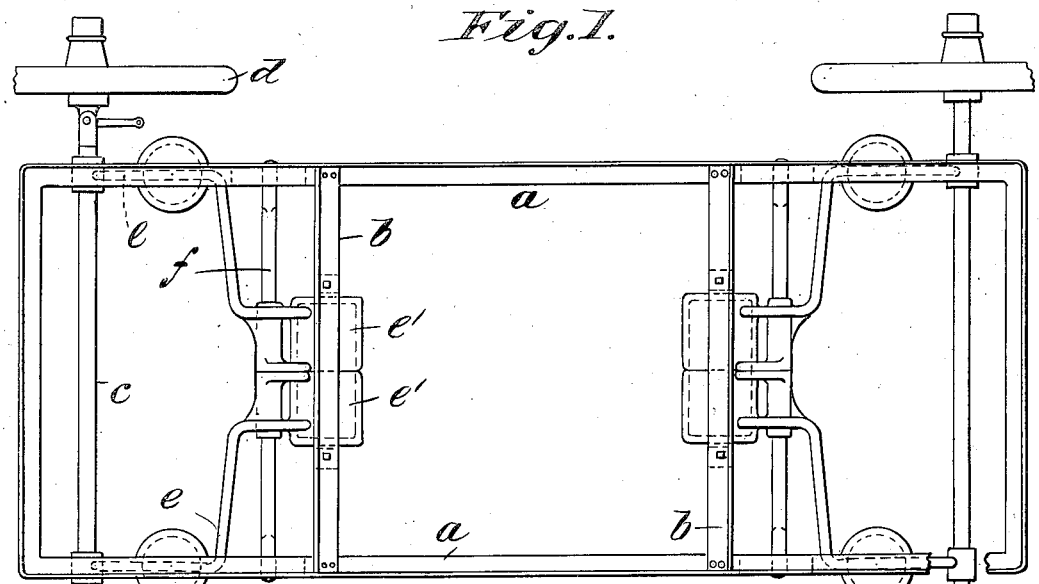
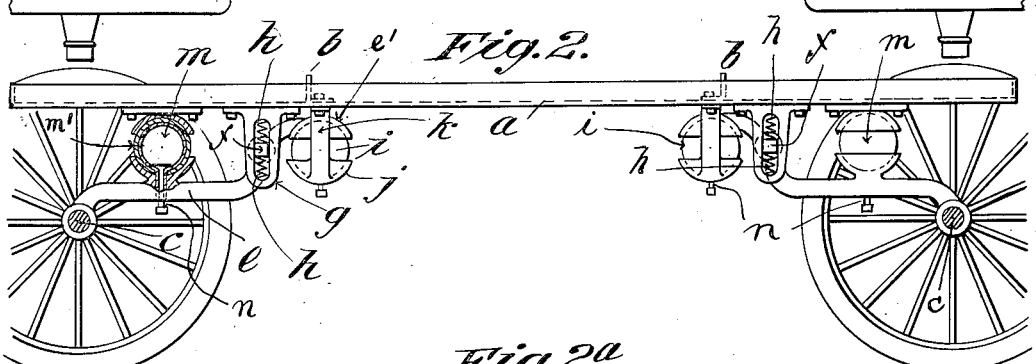
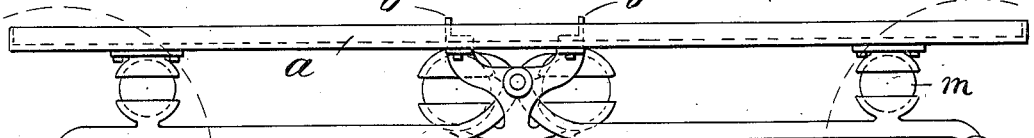
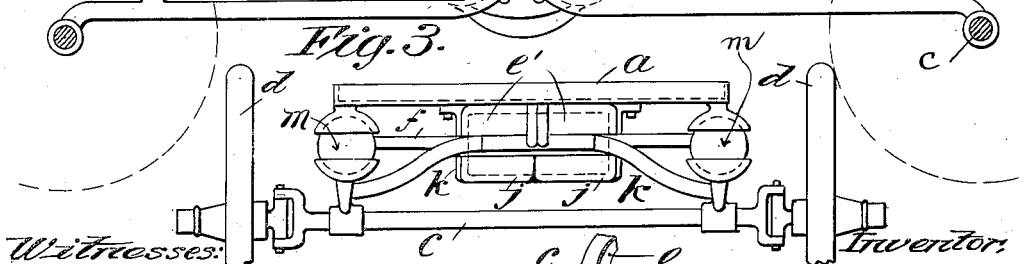

UNITED STATES PATENT OFFICE.

WILLIAM H. CHAPIN, OF SPRINGFIELD, MASSACHUSETTS.

RUNNING-GEAR FOR VEHICLES.

No. 897,270.     Specification of Letters Patent.     Patented Sept. 1, 1908.

Application filed December 11, 1905. Serial No. 291,286.

*To all whom it may concern:*

Be it known that I, WILLIAM H. CHAPIN, a citizen of the United States of America, residing at Springfield, in the county of Hampden and State of Massachusetts, have invented new and useful Improvements in Running-Gear for Vehicles, of which the following is a specification.

This invention relates to vehicles and the object thereof is to provide a pneumatic support for a platform supported on wheels, the pneumatic supports being located between the platform and the wheels, and the construction being such that the shocks and vibrations imparted to the wheels by the inequalities of the road may be taken up by pneumatic cushions. Heretofore, it has been customary to place these cushions on the wheels in the form of pneumatic tires, and while these are efficient, they are expensive and are liable to injury from articles or substances which may be encountered in the road. By means of this invention practically the same effect may be attained as by the use of pneumatic tires for the wheels, so far as the taking up of the vibrations is concerned.

The invention is particularly applicable to self-propelled vehicles, and in this application it is shown and described as applied thereto, but it is obviously equally applicable to any type of vehicle.

In the drawings forming part of this application,—Figure 1 is a plan view of a vehicle with the body removed, showing the application of my invention thereto. Fig. 2 is a side elevation of the same. Fig. 2ᵃ is a side elevation showing a slight modification of the construction embodied in the preceding figures. Fig. 3 is a front elevation of the construction shown in Figs. 1 and 2. Fig. 4 is a perspective view showing part of an axle and one of its supports in section.

Referring to these drawings, in which like letters of reference refer to like parts in the different figures, $a$ indicates the frame or platform on which the body may be mounted and on which the motor would also be supported if the vehicle were of the self-propelled type. This frame, as shown herein, is made of angle-iron pieced together in the form of a rectangle and provided with transverse brace-bars $b$; this particular frame however may be regarded as purely conventional and any other better suited to a particular use substituted therefor.

The front and rear axle supports are substantially the same, and a description of one will suffice. If used on a motor vehicle, however, of course the rear axle would preferably be provided with suitable differential gears, which any one skilled in the art would be capable of applying to the construction.

The front axle (the description of which, together with its supports will clearly set forth the construction as applied to either axle) is indicated by $c$, and on its extremities the wheels $d$, $d$ are mounted on knuckles swinging on vertical pivots in the usual way. This axle is supported in the forward end of two arms $e$, $e$ pivotally supported on a horizontally disposed axis consisting of a shaft $f$ which preferably extends across the frame or platform $a$ and which shaft in turn is supported in the vertically slotted brackets $g$ depending from the under side of the side-members of said frame, suitable springs $h$, $h$ being interposed between the end of the shaft and the upper and lower borders of the vertical slot in the brackets. This permits a certain degree of vertical movement of the ends of the shaft, either independently or together, up or down. Preferably, the arms $e$, $e$ follow the general line of the sides of the frame for a short distance back from the wheel-supporting ends thereof, and their rear ends turn inward toward the center of the frame, all as shown in the drawings,— and preferably, though not necessarily, these arms are made separately and may swing separately on their common axis, the shaft $f$. Each of these arms $e$, $e$ extends beyond the shaft $f$ and is provided with a cup-shaped member $e^1$ which overlies a pneumatic cushion $i$. The latter may be made long enough to permit both members $e^1$ to bear thereon or separate cushions may be provided for each member. These cushions are supported in a cup-shaped or trough-shaped member $j$ having arms $k$ at the ends thereof which may be bolted to the cross-brace $b$ of the frame or other suitable part thereof. These members $e^1$ and $j$ do not entirely inclose the cushions $i$, but the edges of said members are sufficiently separated to permit the compression of said cushions, without permitting said edges to come together. In case of the deflation of the cushion, however, the portion thereof between said edges would bulge out and be compressed between them, providing a more or less resilient buffer for the parts. Near the front ends of said arms $e$, $e$ other pneumatic cushions m are interposed between the frame and the arms, supported in the same manner as the cushion i, and all of the cushions are provided with a tube n, shown in Fig. 2, for the purpose of inflating them. In said Fig. 2 one of the cushions is shown in section and is seen to be provided with a casing of leather or other suitable material $m^1$.

In Fig. 2a a modification of the above described construction is shown which consists in providing a common axis for the wheel-frames at either end, which axis in that case would be located centrally of the frame, transversely thereof. Furthermore, for certain uses for which a vehicle may be designed, the axis on which the wheel-frames are pivoted may be fixed instead of vertically movable, but the latter is the preferred construction.

The pneumatic cushions i may be made in the same manner as the pneumatic tires now in general use, and provided with the usual tube n whereby they may be inflated, the cushions being of cylindrical or spherical shape and capable of withstanding whatever internal air pressure may be required to support the load they are to carry. These cushions should be inclosed in a leather or other suitable casing to protect them from wear. To adapt the vehicle to different loads or to vary the action of the cushions i and m, the degree of inflation thereof may be varied. In any event the cushions i would bear a greater degree of inflation than the cushions m owing to the difference in the length of the leverage of the parts acting upon them. The length of those portions of the arms of the wheel frames lying on opposite sides of the shaft f may be varied to suit the use to which the vehicle may be designed for, or to accommodate the placing of the motors on the frame, or the location of the transmission devices on or under the frame,—and such differences in leverage as may result from such change of form may be compensated for by the size, or the degree of inflation of the cushions or both.

From the above description of the construction, it is seen that one wheel alone may be raised from the ground which, by the independent swinging movement of one of the arms e, will result in the compression of the cushion m and the cushion i associated with the arm, and while this is the preferred construction, the wheel-frame would be operative for the purposes described, if the arms e were rigidly united to swing as one on their axis, for the latter having a yielding vertical movement would accommodate whichever side of the frame were lifted independently, by yielding vertically at the proper time.

The preferred manner of supporting the axles in the arm e is illustrated in Fig. 4 and it consists in fitting a ball $c^1$ on the axle and making the bearing on the end of the arm in two parts adapted to inclose said ball to the end that the axle may not bind in its bearing should one wheel alone be raised, as in passing over an obstruction in the road. The construction as shown in Figs. 1 and 2 is operative that is to say this ball and socket connection shown in Fig. 4 is not absolutely necessary for if a plane cylindrical bearing for the axle is provided as shown in Fig. 1 and one wheel should then pass over an obstruction, there would be no undue strain put upon the parts owing to the yielding movement of which the shaft f is capable.

I do not claim broadly a wheel hung on an arm pivoted under the body of a vehicle and having a spring applied to its rear end which is compressed by the movement of the body vertically, for such construction is generically old, being shown for example in United States Letters Patent to Reichert No. 116,756 dated July 4, 1871.

Having thus described my invention, what I claim and desire to secure by Letters Patent of the United States, is:—

1. A vehicle running gear comprising a frame or platform, a wheel-frame consisting of an axle, two supporting arms therefor, means to pivot said arms between their extremities on an axis parallel with said axle, and pneumatic cushions disposed at opposite ends of the supporting arms, one on each side of the pivotal point thereof, to yieldingly restrict the movement of the ends of said arms in opposite directions.

2. A vehicle running gear comprising a frame or platform, an axle, a wheel-frame consisting of arms disposed longitudinally of the frame and embracing said axle near each end of the latter; means to support the wheel-frame on said platform on an axis parallel with the axle, said axis being arranged to yield in a direction at an angle to the platform, and pneumatic cushions disposed at opposite ends of the supporting arms between the latter and suitable abutments to permit independent vertical movements of said arms.

3. In a running gear for vehicles, a forked wheel frame, a horizontally disposed axis on which said frame may swing; an axle supported in spherical bearings in the forked end of said frame, said bearings and frame being arranged to permit vertical movement of one end of said axle and one of the fork-arms of said frame independently; together with a pneumatic cushion located between the arms of the forked frame and a suitable abutment.

4. In a running gear for vehicles, a forked wheel-frame, a horizontally disposed, vertically yielding axis on which said frame may swing; an axle supported in bearings in the forked end of said frame, said bearings and frame being arranged to permit vertical movement of one end of said axle and one of the fork-arms of said frame independently; together with a pneumatic cushion located between the arms of the forked frame and a suitable abutment.

5. A wheel-frame comprised in the running gear of a vehicle consisting of two arms disposed longitudinally of the vehicle, an axle extending between two ends of said arms, a support on which said arms may swing, which support is located between the two extremities of said arms, a pneumatic cushion located between said arms and suitable abutments on said platform, at either side of said axis.

6. In a running gear for vehicles, a forked wheel frame, an axle carried in the forked extremities thereof, a support for the wheel-frame disposed transversely thereof, capable of movement in a vertical plane, on which the frame may swing on a horizontal axis, and a pneumatic cushion located between said frame and a suitable abutment on the platform of the vehicle.

7. In a running gear for vehicles, an axle, a forked frame secured thereto, a transverse pivotal axis for the forked frame and supported on the platform, cushion means for resiliently supporting the ends of the axis and permitting the same to have a vertical movement relative to the platform at either or both ends of the same.

WILLIAM H. CHAPIN.

Witnesses:
    GEORGE F. PERKINS,
    K. I. CLEMONS.